US012522458B2

(12) United States Patent
Weemaes et al.

(10) Patent No.: US 12,522,458 B2
(45) Date of Patent: Jan. 13, 2026

(54) SHEET REGISTRATION DEVICE FOR NON-RECTANGULAR SHEETS

(71) Applicant: Canon Production Printing Holding B.V., Venlo (NL)

(72) Inventors: Joris M.B. Weemaes, Venlo (NL); Ton A.J.J. Van Bommel, Venlo (NL); Stefan J.G. Bruekers, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 475 days.

(21) Appl. No.: 17/965,300

(22) Filed: Oct. 13, 2022

(65) Prior Publication Data

US 2023/0202786 A1 Jun. 29, 2023

(30) Foreign Application Priority Data

Oct. 21, 2021 (EP) .................................... 21203884

(51) Int. Cl.
*B41J 13/32* (2006.01)
*B41J 3/60* (2006.01)
(Continued)

(52) U.S. Cl.
CPC ................ *B65H 9/002* (2013.01); *B41J 3/60* (2013.01); *B41J 13/32* (2013.01); *B65H 85/00* (2013.01);
(Continued)

(58) Field of Classification Search
CPC ........ B65H 9/002; B65H 9/103; B65H 9/106; B65H 2701/1113; B41J 13/26; B41J 13/32
See application file for complete search history.

(56) References Cited

U.S. PATENT DOCUMENTS

| | | | | |
|---|---|---|---|---|
| 8,308,158 B2 * | 11/2012 | Hirota | B65H 9/002 271/227 |
| 8,398,079 B2 * | 3/2013 | Ootsuka | B65H 9/002 271/239 |

(Continued)

FOREIGN PATENT DOCUMENTS

| | | | |
|---|---|---|---|
| EP | 3398785 A1 * | 11/2018 | B41J 11/0055 |
| EP | 3 398 785 B1 | 2/2020 | |
| JP | 2020-33138 A | 3/2020 | |

OTHER PUBLICATIONS

Machine Translation of JP2020-033138, Google Patents, 2025.*
Search Report issued in European priority application No. 21203884 dated Apr. 22, 2022.

*Primary Examiner* — Patrick Cicchino
(74) *Attorney, Agent, or Firm* — Birch, Stewart, Kolasch & Birch, LLP

(57) ABSTRACT

When duplex printing non-rectangular sheets of printable media, the sheets require proper registration to prevent misalignment of front and back images. This is ensured by: determining relative orientations of three different edges of a sheet being transported towards print station on a first pass; registering the sheet on the first pass by aligning one of the edges with respect to a predetermined alignment direction; printing a first image on a first side of the registered sheet; flipping the sheet on a second pass; registering the flipped sheet by aligning one of the edges with respect to a predetermined alignment direction; and printing a second image on a second side of the registered, flipped sheet aligned with the first image based on the determined relative orientations.

8 Claims, 4 Drawing Sheets

(51) Int. Cl.
*B65H 9/00* (2006.01)
*B65H 9/20* (2006.01)
*B65H 85/00* (2006.01)

(52) U.S. Cl.
CPC ........ *B65H 9/20* (2013.01); *B65H 2701/1113* (2013.01)

(56) References Cited

U.S. PATENT DOCUMENTS

| | | | | |
|---|---|---|---|---|
| 8,649,052 | B2 | 2/2014 | Hoover et al. | |
| 8,695,973 | B2 * | 4/2014 | deJong | B65H 9/002 271/228 |
| 9,354,537 | B2 * | 5/2016 | Ueda | G03G 15/0189 |
| 9,769,327 | B2 * | 9/2017 | Yamazaki | B65H 9/106 |
| 10,358,311 | B2 * | 7/2019 | Yamane | B65H 9/20 |
| 2002/0181021 | A1 | 12/2002 | Stephens | |
| 2012/0112405 | A1 | 5/2012 | Hirota | |
| 2020/0292977 | A1 | 9/2020 | Sato | |
| 2024/0181790 | A1 * | 6/2024 | Wind | B41J 13/26 |
| 2024/0402636 | A1 * | 12/2024 | Mori | G03G 15/6529 |

* cited by examiner

PRIOR ART

SHEET REGISTRATION DEVICE FOR NON-RECTANGULAR SHEETS

BACKGROUND OF THE INVENTION

1. Field of the Invention

The invention relates to printer comprising a sheet registration device as well as to a method for registering sheets while duplex printing.

2. Description of Background Art

Sheet registration devices re-orient sheets into a predetermined position with respect to the print station. This is generally performed by detecting an edge of the sheet and positioning and re-orienting said edge. It was however found that detecting a single edge for registration could yield into misalignment of front and back side images printed on opposite sides of a sheet. Such a misalignment may be visible in the final product, which is undesired. From EP3398785 B1, it is known to determine and correct for a misalignment between the leading and trailing edges of a sheet, but, as explained in more detail with regard to FIGS. 1A, 1B, 2A, 2B, misalignments may then still occur, especially in case of trapezoid-shaped sheets.

SUMMARY OF THE INVENTION

It is an object of the invention to provide an improved method for registering sheets, specifically trapezoid-shaped sheets, with adequate alignment of the front and back side images.

In accordance with the present invention, a method for registering sheets of printable media and a printer are provided. Said method comprises the steps of:

- determining relative orientations of three different edges of a sheet being transported towards a print station on a first pass;
- registering the sheet on the first pass by aligning one of said edges with respect to a predetermined alignment direction;
- printing a first image on a first side of the registered sheet;
- flipping the sheet on a second pass towards the print station;
- registering the flipped sheet by aligning said one of said edges with respect to a predetermined alignment direction; and
- printing a second image on a second side of the registered, flipped sheet aligned with the first image based on the determined relative orientations.

The position of the image on the sheet is determined by the relative position of the sheet with respect to the print station at the start of jetting of ink onto the sheet. The ink jetting is timed with respect to a reference on the sheet, for example the leading edge or a point thereon. For printing the back side image, the sheet is flipped, such that two edges change their relative positions, e.g. the leading edge becomes the trailing edge and vice versa. The reference for starting the printing of the back side image is consequently at a different edge then during the first pass of the sheet. On both passes, the same edge is aligned in a similar manner, for example in the same direction and at the same lateral position. Since the orientations of the other edges with respect to the aligned edge are known, a deviation between the start of printing the first and second images (being the front side and back side images respectively) due to non-parallel edges can be corrected. The start of printing the second image is adjusted accordingly to align the first and second images. This ensures that the images are aligned regardless of the shape of the sheet. Thereby the object of the present invention has been achieved.

More specific optional features of the invention are indicated in the dependent claims.

In embodiment, the print station comprises a page-wide print head array, which during printing is stationary with respect to the sheet registration device. During printing the sheet moves past the page-wide print head array in its transport direction. The position of the image on the sheet is determined by the selection of print heads, which are applied for printing the image. Preferably, the print head array extends perpendicular to the transport direction, such that the selection of print heads determines the lateral position of the image (i.e. its distance with respect to a lateral edge of the sheet). The longitudinal position (e.g. distance from the leading edge) is then determined by the start of printing with the selected print heads.

In an embodiment, the same lateral edge of the sheet is aligned with respect to a predetermined alignment direction on both the first and the second pass of the sheet. In another embodiment, the same lateral edge of the sheet is positioned at the same lateral position on both the first and the second pass of the sheet after registration. The sheet is preferably flipped between passes, such that the relative position of its lateral edges remains the same. The first and second images are then printed with the same lateral offset and at the same orientation with respect to the lateral edge to align them. For example, the first and second images may both be printed perpendicular to the lateral edge, similarly spaced from said edge. Rotational deviations and lateral positional deviations between front and back side images are thereby prevented. It is noted that the same can be achieved with other print directions than perpendicular to the lateral edge as well, but these will require an angular correction due to the tangent change when the sheet is flipped. While it is preferred to register the lateral edge at the same lateral position during both passes, different lateral positions may also be applied for each pass by correcting the lateral position of the second image for the lateral positional difference.

In an embodiment, the step of printing the first image comprises printing the first image offset by a predetermined spacing with respect to a reference point on one of said edges and wherein the printing the second image comprises applying the relative orientations of the three different edges to convert the predetermined spacing for offsetting the second image with respect to a reference point on an edge opposite said one of said edges, such that the first and second images are aligned with one another. The start of the printing of the first image is timed with respect to a reference point on one of the longitudinal edges of the sheet, preferably the leading edge. The first image is thus printed at a predetermined spacing from this reference point. On the second pass, the longitudinal edges have been inverted, which could result in a misalignment between the first and second images if the longitudinal edges are not parallel. Since the relative orientation of the longitudinal edges with respect each other (and one lateral edge) is known, the spacing of the second image with respect to the reference point on the second pass can be corrected to prevent misalignment. The start of printing the second is thus timed correctly, such that the first printed line of the second image overlap with the last printed line of the first image. In a basic example, the first image is displaced from e.g. the top right corner of the sheet on the first pass by a certain spacing vector. On the second pass, the sheet is flipped, so that a different corner becomes the top-right corner on the second pass. By applying the relative orientations of the edges, the dimensions of the image, and/or the dimensions of the sheet the spacing vector can be transformed into a corresponding spacing vector for the second pass with respect to the new top-right corner, such that the front and back images are aligned. Any reference point on the sheet may herein be used.

In an embodiment, the method according to the present invention further comprises the step of determining a printable area aligned on both sides of the sheet based on the determined relative orientations and printing the first and second images are printed on the registered sheet within said printable area. The printable area lies within the edges of the sheet and is generally larger in area than the first and second images. The printable area is determined before printing the first image for both sides of the sheet and prevents printing outside the edges of the sheet.

In an embodiment, the printable area is a rectangle extending perpendicular to a lateral edge of the sheet, preferably perpendicular the aligned lateral edge of the sheet. The lateral side of the rectangle is preferably parallel to and/or positioned at the aligned lateral edge of the sheet, while the longitudinal edges of the rectangle are perpendicular to said lateral edge of the sheet.

In an embodiment, two corners of the printable area are positioned on the aligned lateral edge and:

- when the two corners of the sheet along the aligned lateral edge are greater than 90°, a third corner of the printable area is positioned on the other lateral edge of the sheet opposite the aligned lateral edge; or
- when at least one of the two corners of the sheet along the aligned lateral edge is less than 90°, a third corner of the printable area is positioned on the longitudinal edge of the sheet connected to the one of the two corners of the sheet with the smallest angle. The printable area is the at the same position for both sides of the sheet, like a single rectangle on a transparent foil. Since the printable area is within the edges of the sheet, it is ensured that no portion of the first or second image will be printed outside of the sheet. When the aligned sheet tapers outwardly from the aligned lateral edge along the lateral direction, the printable area can extend up to the opposite lateral edge. The corner on the aligned lateral edge closest to the opposite lateral edge, when measured in the lateral direction, defines the third corner of the printable area. When the lateral edges are parallel, both corners at the aligned lateral edge define the third and fourth corners of the printable area in this manner. When one corner of the sheet at the aligned lateral edge is less than 90°, the longitudinal edge of the sheet defining this corner will delimit the printable area. The third corner of the printable area will positioned on this longitudinal edge of the sheet. Of the two corners at the aligned lateral edge, the corner with smallest angle will connect to the longitudinal edge upon which the third corner of the printable will be positioned, also when two corners at the aligned lateral edge are less than 90°.

In an embodiment, determining the printable area comprises maximizing area the area of the rectangle within the surface of the sheet. The printable area is taken be as large as possible.

In an embodiment, the alignment direction for registering the sheet is parallel to a transport direction of the sheet relative to the print station. The sheets are transported in the transport direction along their transport path, which includes the print station and the sheet registration device. In consequence, the first and second images are printed parallel to the aligned lateral edge, when the print head array extends perpendicular to the transport direction.

In an embodiment, the method according to the present invention further comprises sensing an orientation of each of the three edges of the sheet, wherein the orientation of the be aligned edge is sensed perpetually during registration. The to be aligned edge is sensed perpetually and/or continuously during its registration process, such that its final alignment with the alignment direction can be confirmed. The controller is configured to apply adjustments to the registration unit based upon the sensed orientation of this edge during registration. The other two edges need only be sensed once to determine their relative orientation with respect to the to be aligned edge. For accuracy, it is preferred that each longitudinal edge is sensed at the time as sensing the lateral edge. Based on that the orientations of the other two edges can be derived from the sensed orientation of the to be aligned edge at any time.

In an embodiment, the method according to the present invention further comprises a step of minimizing a distance between consecutive sheets after registration. Since the shapes of the sheets can be derived from the relatively orientations, the sheets can be positioned to minimize the distance between them without overlapping consecutive sheets.

The present invention further relates to a printer comprising:

- a sheet registration device for a printer, which comprises:
  - a sensor assembly configured for sensing relative orientations of three different edges of a sheet being transported through the registration device;
  - an actuator assembly configured for re-orienting the sheet, such that one of the edges of the sheet is aligned with a predetermined alignment direction;
- a controller configured to:
  - determine relative angle parameters corresponding to angles between at least two different pairs of said edges from data from the sensor assembly; and
  - printing a second image on a second side of the sheet opposite a first side printed with a first image, wherein the second image is aligned with the first image based on the relative angle parameters.

The actuator assembly orients one of the sensed edges with respect to a predetermined alignment direction during both passes of the sheet along a print station, which will print the images on both sides of the sheet. Each of the images is positioned on the sheet with respect to its leading edge and a lateral edge of the sheet. In case of a pagewide printhead array, the position of the image in the transport direction (with respect to the leading edge) is determined by the start timing by which the print head array commences printing. The lateral position (with respect to the lateral edge) is determined by the selection of nozzles of the print head array which will be used to jet ink droplets. After printing the first image, the sheet is returned to the sheet registration device via a duplex pass. The duplex pass comprises a turn station, which flips the sheet over, such that its longitudinal edges are reversed. The flipped sheet is then registered again by the actuator assembly based on the detection of the new leading edge. Deviations in the direction of different, non-parallel leading edges on consecutive passes of the sheet can be taken into account, since the relative orientations of the edges are known. This allows the controller to accurate control the print head array to start the printing of the second image such that it aligns with the first image.

In an embodiment, the controller is configured to control the actuator assembly to align the same edge of the sheet with the predetermined alignment direction on both passes of the sheet. The same edge is used for registering the sheet. Since the relative orientations of the edges are known the sheet, the orientation of the printed first image with respect to said edges is available. After the sheet is flipped, the same edge is used for registration for back side printing. The other edges then have changed places. Since the relative orientations between the edges are known, this can be taken into account when positioning the second image on the sheet. Preferably, the same edge is a lateral edge of the sheet.

In an embodiment, the sensor assembly comprises a pair of linear detector arrays spaced apart from one another in the transport direction and extending perpendicular to the transport direction for sensing a lateral edge of the sheet during registration. This allows the lateral edge to be tracked during registration. The relative angular orientation as well as lateral position of the edge can be followed as the sheet is registered to the desired orientation. When this lateral edge is used for registering the sheet, linear detector arrays allow for determining the initial orientation of the edge as well as for confirming the alignment of the sheet with the alignment direction at the intended lateral position. The lateral edge may also be followed intermediate these states, making it possible to correct the actuator assembly when the sheet deviates from the intended movement. Further, the data from linear detector array allows the orientation of the lateral edge to be tracked during registration. In case the registration is not fully executed (i.e. the sheet deviates from the intended lateral position and/or orientation), the final orientation and/or position of the sheet can be sensed and compared to data from the longitudinal edge sensors to still obtain an accurate determination of the angle between the lateral edge and the leading and/or trailing edge.

In an embodiment, the controller is configured to determine a printable area by maximizing an area of a rectangle positioned within the sheet's edges and extending perpendicular to the one edge to be aligned with the alignment direction during registration. To avoid printing the images outside the sheet's surface, a printable area is determined and maximized. The printable area is derived from the relative orientations of the sheet's edges. The printable area extends preferably laterally from the aligned lateral edge until it contacts one of the other edges of the sheet. The height and/or width of the printable area are therein selected, such that the surface area of the printable area is maximized. The controller then controls the print head array to print inside this printable area.

The present invention further relates to sheet registration device for use a printer comprising:

- a sensor assembly configured for sensing relative orientations of three different edges of a sheet being transported through the registration device;
  - an actuator assembly configured for re-orienting the sheet, such that one of the edges of the sheet is aligned with a predetermined alignment direction;
- a controller configured to:
  - determine relative angle parameters corresponding to angles between at least two different pairs of said edges from data from the sensor assembly; and
  - orienting the sheet on a second pass of the sheet along the sheet registration device, such that, when printing a second image on a second side of the sheet opposite a first side printed with a first image, wherein the second image is aligned with the first image based on the relative angle parameters.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1A:
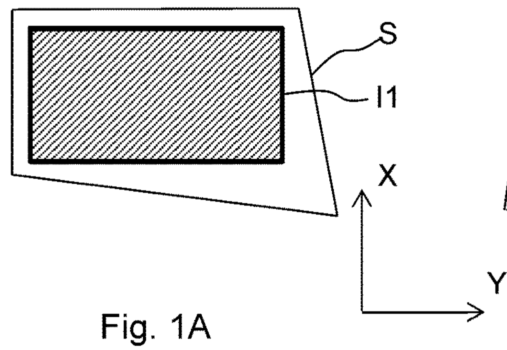
FIGS. 1A-2B schematically illustrate misalignment errors which may occur when using a sheet registration device according to the prior art.

The present invention will now be described with reference to the accompanying drawings, wherein the same reference numerals have been used to identify the same or similar elements throughout the several views. It will appreciated that in the drawing the deformation of the sheets S has been exaggerated for illustrative purposes.

FIG. 1A illustrates the issues which occur when using a registering method according to the prior art. The sheet S in FIG. 1A is non-rectangular, for example due deviations during its cutting process. The sheet S in FIG. 1A has three non-straight corners, the bottom right corner being less than 90°. A front side image I1 has been printed on the sheet S after the sheet S was registered by aligning its leading edge (top edge in FIG. 1A) parallel to the lateral direction Y, which is perpendicular to the transport direction X in which the sheet S is conveyed along its transport path towards the print station (not shown). After printing the front side image I1, the sheet S is flipped, usually along a lateral axis in the direction Y, such that the unprinted side will face the print station. Again, the flipped sheet S is registered before reaching the print station by aligning its current leading edge (which was the trailing edge during its first pass along the print station) in the lateral direction Y. A back side image I2 is then printed on the registered, flipped sheet S. However, since the leading and trailing edges of the sheet S are not parallel, the back side image I2 is printed rotationally displaced with respect to the front side image I1. This rotational deviation will result in a visually unappealable print product. When for example processing the sheets S into a book, the pages will be cut again and bound together, but only the front side images I1 or only the back side images I2 will be properly aligned with the book's spine. The effect becomes even more obvious when using (semi)transparent print media, such as low grammage paper.

Figure 2A:
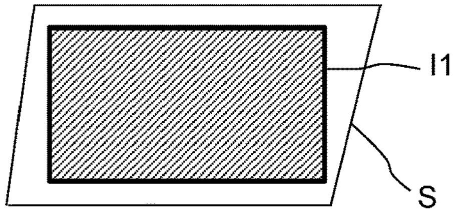
Fig. 2A PRIOR ART
Figure 2B:
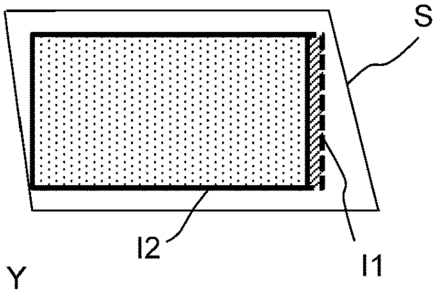

FIGS. 2A and 2B illustrate that front and back side image misalignment will still occur even when the trailing and leading edges of the sheet S are parallel. In FIG. 2A the lateral edges of the sheet S are not perpendicular to the trailing and leading edges. This results in a lateral shift of the back side image I2 with respect to the front side image I1, as the lateral edge position as well as the leading edge is used to determine the starting point for printing the images I1, I2.

Figure 3:
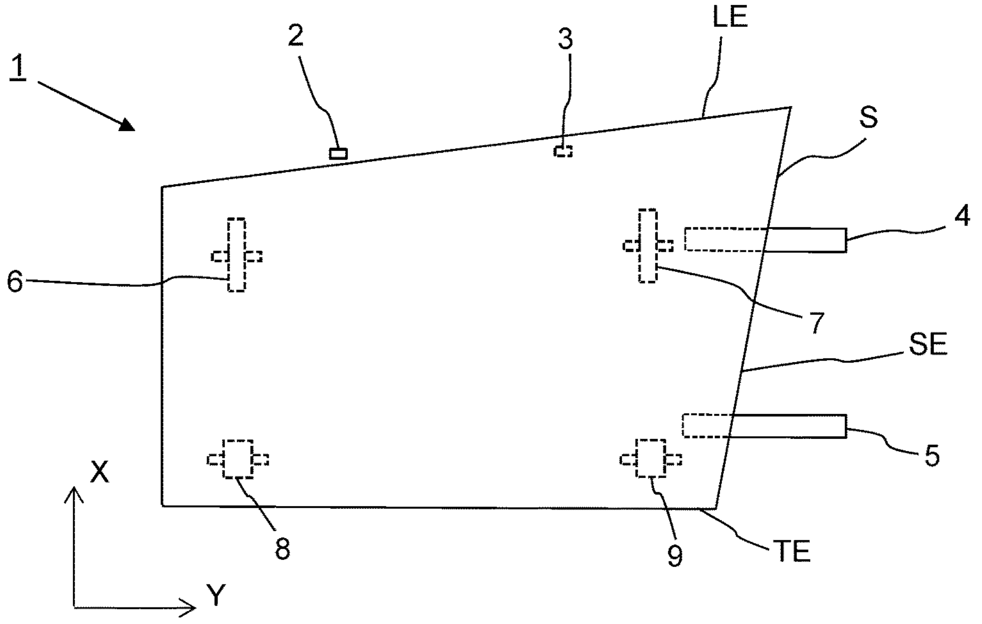
FIG. 3 schematically illustrates a sheet registration device according to the present invention.

The present invention proposes a sheet registration device 1, as shown in FIG. 3, which is able to properly align the front and back side images I1, I2 on non-rectangular sheets S, regardless of the relatively orientations of the different edges of the sheet S. The sheet registration device 1 comprises a sheet registration unit 6, 7 configured to re-orient and/or laterally shift the sheet S. The registration unit 6, 7 is preferably configured to rotate the sheet S around an axis perpendicular to the plane of the sheet S and/or to adjust the lateral position of the sheet S in the direction Y. The sheet registration device 6,7 in FIG. 3 comprises a pair of undependably drivable steering rollers 6, 7. By driving the steering rollers 6, 7 at different velocities, the sheet S may be rotated, as well as moved further along in the transport direction X. In this manner, the lateral position of the sheet S may be changed as well. The steering rollers 6, 7 may further be configured to rotate around an axis perpendicular to the directions X, Y to improve the efficiency of the registration movement. FIG. 3 further illustrates a pair of feed rollers 8, 9 upstream of the steering rollers 6, 7 in the transport direction X, which feed rollers 8, 9 are arranged to transport a sheet S onto the steering rollers 6, 7. It will be appreciated that every roller 6-9 may be part of a pinch, wherein a further roller is positioned opposite said roller 6-9, such that the sheet S is pinched between said roller 6-9 and the further roller for improved grip on and control of the sheet S.

A sensor assembly 2-5 is provided at the registration unit 6, 7 to determine the orientations of three or more different edges of the sheet S. Orientation is preferably defined as the direction in which the respective edge extends, specifically within the plane X, Y of the sheet S on the sheet registration device 1. The orientation may be expressed for example in terms of an angle or tangent with respect to the X or Y axis, or by any other suitable parameter.

The sensor assembly 2-5 comprises longitudinal edge sensors 2, 3 arranged to determine the orientation and/or direction of the trailing edge TE and/or leading edge LE of the sheet S. This is achieved by two spaced apart edge detection sensors 2, 3 provided at predetermined positions. The edge detection sensors 2, 3 may be formed by a light, such as a photodiode, and a (photo)detector to determine the passage of a longitudinal edge over said edge detection sensor 2, 3. From the timing of the passage of the respective edge and the predetermined positions of the longitudinal edge detection sensors 2, 3, the orientation of the leading edge LE may be determined. Similarly, the orientation of the trailing edge TE may be determined as it passes over the edge detection sensors 2, 3. Other suitable sensors such as contact sensors or (CCD) cameras may be applied for determining the orientation of the longitudinal edges LE, TE.

It will be appreciated that the sheet registration unit 6, 7 is used as an example and that other means for registering the sheet S may be applied within the present invention. These means may include for example an alignment wall protruding from a sheet support surface. The alignment wall is positionable at the intended lateral position and the sheet S is moved against the alignment with its lateral edge, such that said lateral edge orients parallel to the alignment wall. In another example, the alignment wall is moveable to shift and rotate the sheets S into the intended orientation and position.

The sensor assembly 2-5 further comprises lateral edge sensors 4, 5 arranged to determine the orientation and/or direction of at least one lateral edge SE (or side edge SE) of the sheet S. In FIG. 3, the lateral edge sensors 4, 5 are illustrated as linear detector arrays 4, 5, which are at different positions in the transport direction X. The lateral edge sensors 4, 5 extend in the lateral direction Y. In FIG. 3, the lateral edge sensors 4, 5 are formed by linear detector arrays 4, 5. These detector arrays 4,5 allow for the detection of the lateral sheet edge SE at different positions, such that the orientation of the lateral edge SE can be tracked during the registration movement. The initial orientation in which the lateral edge SE arrives at the linear detector arrays 4, 5 can be determined. The completion of aligning the lateral edge SE in the transport direction X can also be confirmed, as well as the sensing of any orientation in between these two states. It will be appreciated that different sensor assemblies may be applied for tracking the orientation of the lateral edge, such as a camera system combined with image recognition software.

The method of registering a sheet S by means of the sheet registration device 1 will be explained with regard to FIGS. 4A to 4D. The steps of the method are further illustrated in the block diagram in FIG. 8.

The non-rectangular sheet S arrives at the sheet registration device 1 in an initial orientation. The feed rollers 8, 9 receive the sheet S from an upstream portion of the transport path and move the sheet S further towards the steering rollers 6, 7. As the sheet S passes over the lateral edge sensors 4, 5 in FIG. 4A, the orientation of the lateral edge SE is detected. This orientation is stored on a memory of a controller of the respective printer, for example as a vector or an angle with respect to the X or Y axis.

When the leading edge LE passes over the longitudinal edge sensors 2, 3, the orientation of the leading edge LE with respect to the lateral edge SE is determined. This can be done by e.g. comparing the vectors of both edges SE, LE to one another to determine a parameter corresponding to the relative angle A1 between the leading edge LE and the lateral edge SE. It will be appreciate that the positioning of the linear sensor arrays 4, 5 allows both edges SE, LE to be detected simultaneously, thus eliminating any errors due to displacement of the sheet S between measurements. This positioning of the sensors 2-5 allows the registration movement to start as soon as the sheet S reaches the steering rollers 6, 7. The trailing edge TE is preferably sensed after the lateral edge SE has been aligned to the transport direction X, allowing for easy determining of the angle between these edges, SE, TE based on the data from the longitudinal edge sensors 2, 3.

Figure 4A:
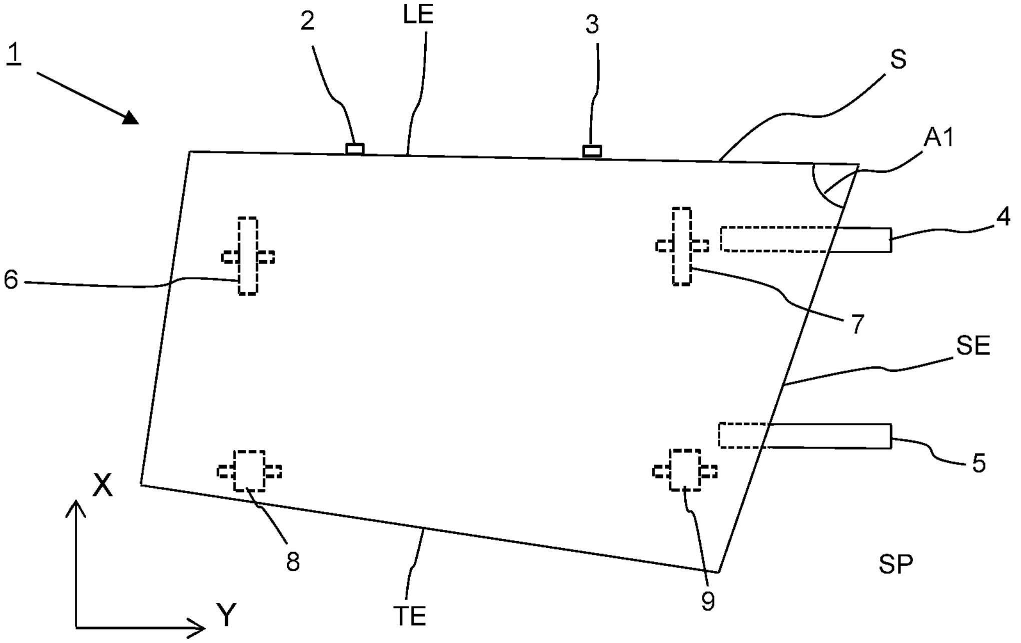
FIGS. 4A-4D schematically illustrate the steps by which the sheet registration device of FIG. 3 registers a sheet on both passes of the sheet.
Figure 4B:
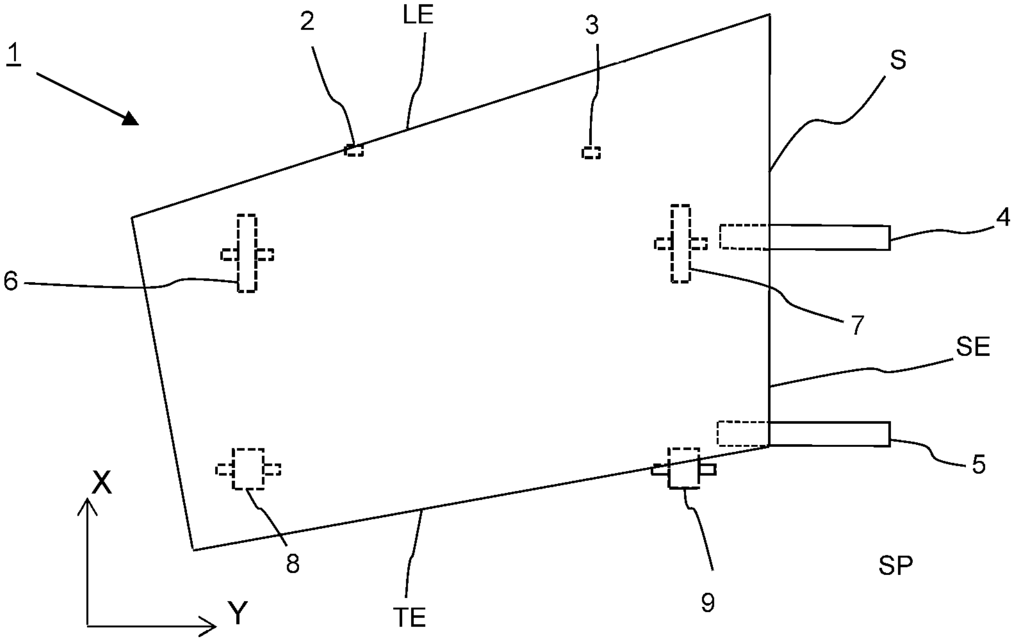

In FIG. 4B, based on the determined initial orientation of the lateral edge SE, the controller instructs the steering rollers 6, 7 to apply suitable velocity profiles to different portions of the sheet S to align the lateral edge SE with the desired alignment direction. In this example, the alignment direction is parallel to the transport direction X for both passes of the sheet S. Herein the lateral edge SE is also positioned at a predetermined lateral position. During registration, the orientation of the lateral edge SE may be continuously tracked by the lateral edge sensors 4, 5 to verify its final alignment and/or perform additional corrections. It will be appreciate that the sheet S is in perpetual forward motion while in the sheet registration device 1 to achieve high throughput.

Figure 4C:
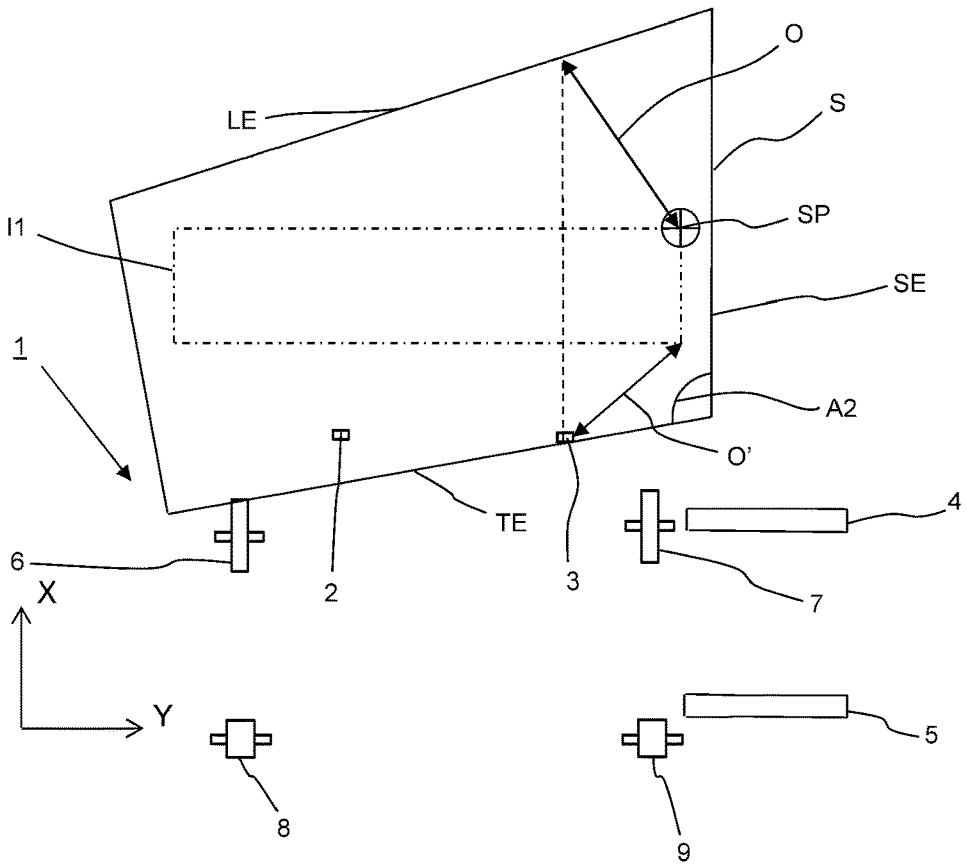

In FIG. 4C, the lateral edge SE has been position in the lateral direction Y and aligned parallel to the transport direction X. In FIG. 4C, the trailing edge TE passes over the longitudinal edge sensors 2, 3, such that the orientation of the trailing edge TE with respect to the lateral edge SE can be determined. This information is stored in a suitable parameter, for example as the relative angle A2. Additionally, a length (L in FIG. 5) of the lateral edge SE may be determined by the longitudinal edge sensors 4, 5 and stored onto a memory of the controller. In case the lateral edge SE has not been fully registered at the intended lateral position and/or orientation, the final orientation and/or lateral position of the lateral edge SE is detected by the lateral edge sensors 4, 5 and stored on a memory of the controller. The trailing edge TE is then sensed using longitudinal edge sensors 2, 3 and the determined orientation with respect to the stored orientation of the lateral edge SE can be determined. In consequence, the back side image I2 can be properly aligned regardless whether the registration of the sheet S is executed fully as intended. Any deviations from the intended registration can be corrected using data from the sensors 2-5. It will be appreciated that additional longitudinal edge sensors may be provided on the sheet registration device.

Based on the parameters for the relative angles A1, A2 and the length L of the lateral edge LE, the printable area (PA in FIG. 5) for both sides of the sheet S is determined and preferably maximized. This step will be illustrated in detail with regard to FIG. 5 later on. After the sheet S has passed the sheet registration device 1 it progresses towards the print station, which is preferably positioned adjacent and/or (directly) downstream of the sheet registration device 1. The print station then prints a front side image (I1 in FIG. 5) on the first side of the registered sheet S within the determined printable area PA. In FIG. 4C, a starting point SP, for example the top-right corner, of the front side image I1 is indicated.

After front side printing, the sheet S is flipped along the lateral axis Y and returned to the sheet registration device 1 via a duplex pass of the printer. Generally, the sheet S is flipped such that its leading and trailing edges change places, while the lateral edges SE maintain the same left or right positions as on the earlier simplex pass.

Figure 1B:
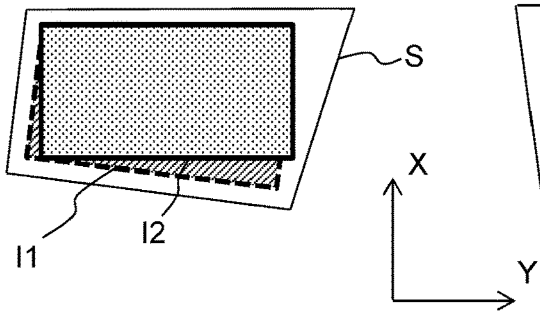
Figure 4D:
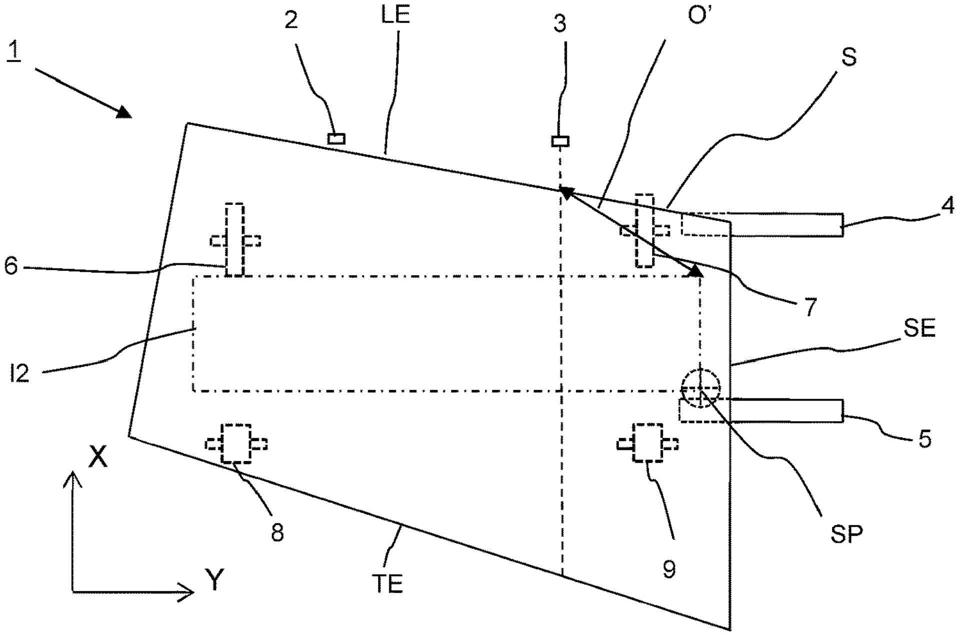

FIG. 4D indicates the step of registering the flipped, printed sheet S. The same lateral edge SE as in FIG. 4B is aligned with the transport direction X and positioned at the same lateral position. As will be shown in FIG. 5, the determined printable PA then defines the same area as on the first pass of the sheet S in FIG. 4B. Subsequently, the registered sheet S is passed to the print station, wherein the back side image (I2 in FIG. 5) is printed on the second side of the sheet S. Therein, the position of the starting point SP of the front side image I1 is taken into account, along with the relative angles A1, A2, the length L of the lateral edge E, and a dimension such as the height of the first image I1, such that the back side image I2 is printed aligned with the front side image I1. Specifically, the controller determines the offset O of the starting point with respect to a reference point, for example as a vector extending between the top-right corner of the sheet S and the intended position of the top-right corner of the front side image I1. In the example of FIG. 4C, the offset O is the displacement vector between the point on the leading edge LE detected by one of the longitudinal edge sensors 2, 3 and the to top-right corner of the be formed image I1. On the duplex pass, the same lateral edge SE is registered similarly to the first pass, such that the lateral edge SE is at the same lateral position and extends in the same direction X as on the first pass. By applying the determined relative angles of the different edges, the offset O can be converted to determine a corresponding offset O' for the back side image I2 with respect to the point where said one of the longitudinal edge sensors 2, 3 will detect the new leading edge of the sheet S, such that the front and back side image I1, I2 will be aligned. The position of the image I1 on the sheet S with respect to the edges LE, SE, TE is known. The corresponding offset O' in FIG. 4C-D extends between the bottom right corner and the reference point where the longitudinal edge sensor 3 will pass below the respective edge. The corresponding offset can be deduced from the angles A1, A2, the sheet length L, and the length of the image I1 in the transport direction X. Since the sheet S is flipped on the second pass so the bottom right corner of the first image I1 in FIG. 4C becomes the top right corner on the second pass. The corresponding offset O' can be used to start the printing of the second image I2, such that its top right corner is positioned at the one of the first image I1. Thus, the timing of starting the printing of each image I1, I2 can be timed with respect to the print station, such that the images I, I2 will overlap fully. For example, the bottom right corner of the back side image I2 will be at the same position as the corner of the front side image I1 which was printed at the starting point SP. The front back side images I1, I2 will further be parallel to one another (no rotational deviation as shown in FIG. 1B), since the same lateral edge SE is used to register the sheet S on both passes.

An additional advantage of the above described method is that when a stack of sheets is formed is this manner all images in the stack are aligned with one another. The printed stack is generally processed further, for example by cutting the stack as a whole to a predetermined size and binding the sheets S together. Such processing operations generally use one corner of the stack as a reference. When deviations as shown in FIGS. 1B and 2B are present in the stack, these will be visible in the final product (or require manually aligning the individual sheets in the stack). The proposed method aligns the images with respect to the same corner, such that the images are suitably aligned for further processing after the stack has been formed by the printer.

Figure 5:
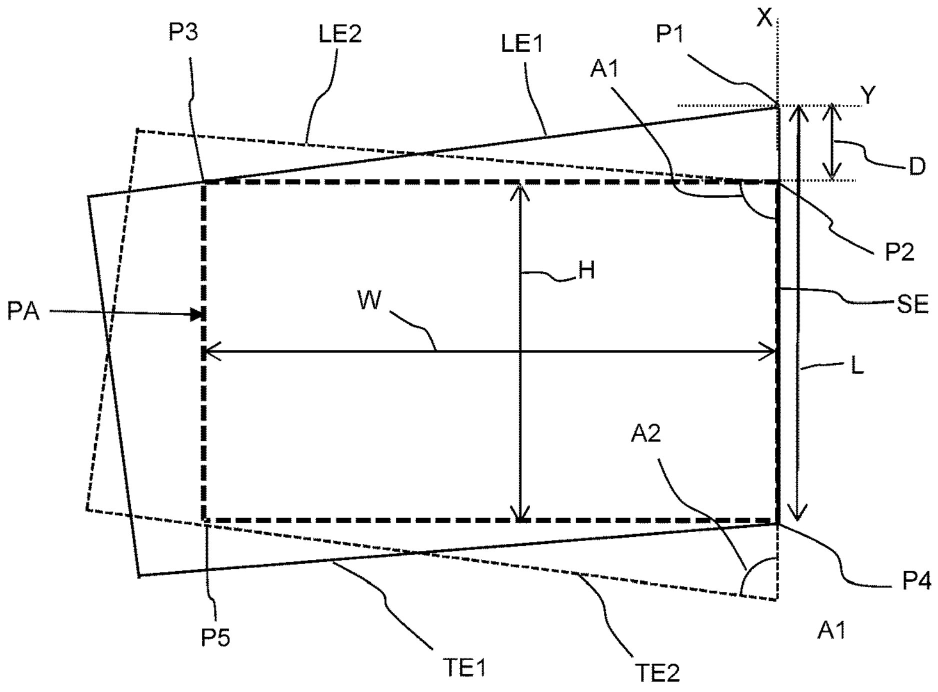
FIG. 5 schematically illustrate the step of determining a printable area on the sheet.

FIG. 5 illustrates the step of determining the printable area PA of the sheet S. The printable area PA is in this example derived from the relative angles A1, A2 between the lateral edge SE and respectively the trailing edge TE1 and the leading edge LE1 (on the first pass of the sheet S) as well as from the length L of the lateral edge SE. FIG. 5 illustrates the sheet S on its first pass after having been registered parallel to the transport direction X (solid line). In dashed lines, the flipped sheet S on its second pass is indicated after having been registered at the same lateral position as during the first pass. So the sheet S in its original state and in its flipped state is has its lateral edge SE parallel to the transport direction X and at the same position along the lateral axis Y. The sheet S and the flipped sheet S can however be offset from one another in the transport direction X by a distance D. Distance D is indicated as the distance between the top-right corners of the sheet S in its original and flipped state. The distance D can be used and/or varied to maximize the printable area PA.

Figure 6A:
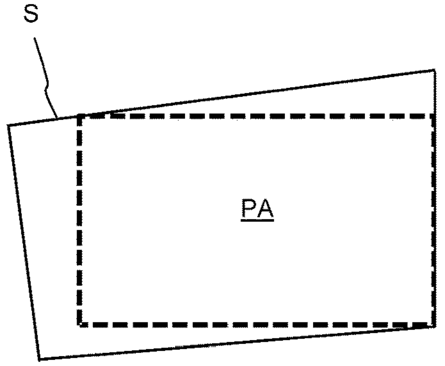
FIG. 6A-B schematically illustrate the printable area determined by the step of FIG. 5.
Figure 6B:
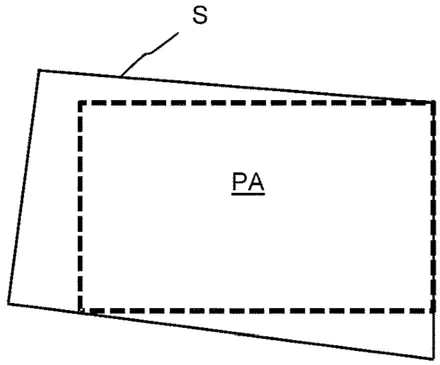

The printable area PA is FIG. 5 is formed by the largest possible rectangle starting at and perpendicular to the lateral edge SE within the outer edges of the sheet S in its original and in its flipped state. P1 in FIG. 5 is the intersection between the axes X, Y and the vector of the leading edge LE1 of the sheet S on its first pass. The leading edge LE2 of the flipped sheet S passes through axis X a distance D from the axis Y at point P2 on the lateral edge SE. In turn point P2 defines a point P3. Point P3 is the intersection nearest the lateral edge SE of either leading LE1 or flipped leading edge LE2 with a line perpendicular to the lateral edge SE and passing through point PE. The tangents or vectors for leading LE1 or flipped leading edge LE2 are derived from their respective relative angles A1, A2. Similarly, point P4 is defined by distance L from P1 along the axis X. The point P5 is found by determining the intersection nearest the lateral edge SE of a line parallel to the axis Y and passing through point P4 and one of trailing edges TE1, TE2 on the first and second passes of the sheet S. Again, the tangents of the trailing edges TE1, TE2 are derived from the relative angles A1, A2. The shortest of distance P2-P3 and P5-P5 is taken as the width W of the printable area PA. Multiplying said width W by the height H (which is equal to L-D in FIG. 5) of the printable area PA yields the surface area of the printable area PA. This surface area may be maximized with respect to the distance D to find the maximum printable area PA. This distance D is stored and applied to correctly align the front and back side image I1, I2, when printing these within the printable area PA. It will be apparent that in the example in FIG. 5 the distance D can also be varied in the opposite direction (above the axis Y), with suitable amendments, as the point P2 will be fixed at the position of P1, while point P4 will be determined by a distance L-D. Maximization can be achieved computationally and/or mathematically. For reference the sheet S with the printable area PA on its first pass is shown in FIG. 6A, while the sheet S with the printable area PA on its second pass is shown in FIG. 6B.

Figure 7:
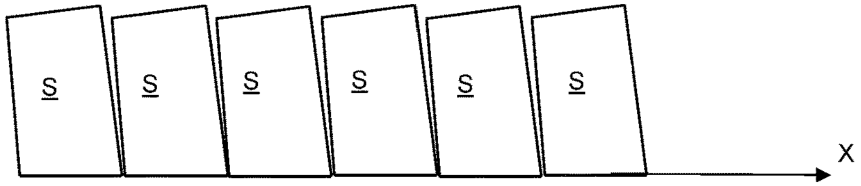
FIG. 7 schematically illustrates the step of minimizing the distance between consecutive sheets.

FIG. 7 illustrates the step of minimizing the inter-sheet distance between subsequent sheets S after registration. Since the relative orientations of the sheets S are known, the distance between them can be minimized without the sheets S overlapping. This provides high throughput through the print station. FIG. 7 illustrates the example where the sheets S have been similarly cut, which is common for batch processed sheets S. The sheets S are oriented in such a manner that they touch each other only at the adjacent corners. The sheets S do not overlap anywhere else. The orientations are used to adjust the distance between subsequent sheets S, such that subsequent trailing and leading edges intersection at a single point without the sheets S overlapping. It will be appreciate that in this example the minimum inter-sheet distance is taken as zero, but instead of actual zero a minimal non-zero distance value may be applied, for example for safety reasons.

Figure 8:
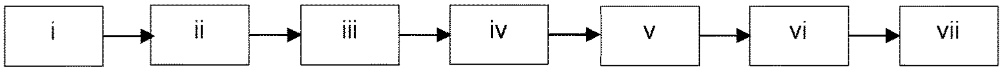
FIG. 8 is a block diagram schematically illustrating the steps of the present invention.

FIG. 8 schematically indicates the step of the proposed method of registering sheets S. In step i, at least three edges of the sheet S are sensed. This sensor data is applied in step ii to determine the relative orientations and/or angles of said edges LE, TE, SE with respect to one another. In step iii, the printable area PA of the sheet S is maximized based on the determined orientations and/or relative angles A1, A2. It will be appreciated that step ii may be omitted and the method may proceed from step ii to step iv, which is the registering of the sheet S by aligning its lateral edge SE with the transport direction X (or another desired direction). In step v a front side image I1 is printed on the sheet S, preferably within the printable area PA. Subsequently, the printed sheet S is flipped such that its unprinted side will face the print station when it returns there. In step vi, the flipped sheet S is registered again by aligning the same lateral edge SE as in its first pass with the transport direction X. In step vii, the back side image is printed onto the unprinted side of the sheet S. Therein, the relative orientations and/or angles of said edges LE, TE, SE are used to correctly align the front side image I1 with the back side image I2. By aligning the same lateral edge SE on both passes of the sheet S, alignment of the images I1, I2 in the lateral direction Y is ensured. The relative orientations and/or angles of the edges LE, TE, SE are used to correctly time the start of the print process, such that the first line of the back side image I2 is printed overlapping the last printed line of the front side image I1.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for registering sheets of printable media, comprising the steps of:

determining, by sensors, relative orientations of three different edges of a sheet being transported towards a print station on a first pass;

registering the sheet on the first pass by aligning one of said edges with respect to a predetermined alignment direction;

printing, by a printer, a first image on a first side of the registered sheet such that the first image is printed offset by a spacing with respect to a first reference point on one of said edges;

flipping the sheet on a second pass;

registering the flipped sheet on the second pass by aligning one of said edges with respect to a predetermined alignment direction, wherein the sheet is registered on both the first pass and the second pass using a same lateral side edge of the sheet;

applying the relative orientations of the three different edges to convert the spacing to one offsetting a second image with respect to a second reference point on an edge opposite said one of said edges on which the first reference point resides, and printing, by the printer, a second image on a second side of the registered, flipped sheet aligned with the first image based on the determined relative orientations by printing the second image offset by the converted spacing with respect to the second reference point.

2. The method according to claim 1, wherein the alignment direction for registering the sheet is parallel to a transport direction of the sheet relative to the print station.

3. The method according to claim 1, wherein the orientation of the aligned edge is sensed perpetually during registration.

4. The method according to claim 1, further comprising a step of minimizing a distance between consecutive sheets after registration.

5. The method according to claim 1, wherein the same lateral edge of the sheet is aligned with respect to a predetermined alignment direction on both the first and the second pass of the sheet after registration.

6. The method according to claim 2, wherein the same lateral edge of the sheet is positioned at a same lateral position on both the first and the second pass of the sheet after registration.

7. A printer comprising:

a sheet registration device, the sheet registration device comprising:

sensors configured for sensing relative orientations of three different edges of a sheet being transported through the registration device; and drivable steering rollers configured for re-orienting the sheet, such that one of the edges of the sheet is aligned with a predetermined alignment direction; and a controller configured to:

determine relative angle parameters corresponding to angles between at least two different pairs of said edges from data from the sensor assembly;

register the sheet on first and second passes using a same lateral side edge of the sheet, wherein the sheet is flipped on the second pass;

printing a first image on a first side of the registered sheet such that the first image is printed offset by a spacing with respect to a first reference point on one of said edges;

applying the relative orientations of three different edges to convert the spacing to offset a second image with respective to a second reference point on an edge oppositive said one of said edges on which the first reference point resides; and printing the second image on a second side of the sheet opposite the first side, wherein the second image is aligned with the first image based on the relative angle parameters by virtue of the second image being printed offset by the converted spacing with respect to the second reference point.

8. The printer according to claim 7, wherein the sensors comprise a pair of linear detector arrays spaced apart from one another in the transport direction and extending perpendicular to the transport direction for sensing a lateral edge of the sheet during registration.

* * * * *